(12) United States Patent
Iwamatsu

(10) Patent No.: US 9,569,245 B2
(45) Date of Patent: Feb. 14, 2017

(54) SYSTEM AND METHOD FOR CONTROLLING VIRTUAL-MACHINE MIGRATIONS BASED ON PROCESSOR USAGE RATES AND TRAFFIC AMOUNTS

(71) Applicant: FUJITSU LIMITED, Kawasaki-shi, Kanagawa (JP)

(72) Inventor: Noboru Iwamatsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/631,299

(22) Filed: Feb. 25, 2015

(65) Prior Publication Data
US 2015/0277955 A1 Oct. 1, 2015

(30) Foreign Application Priority Data
Mar. 31, 2014 (JP) .................................. 2014-071965

(51) Int. Cl.
*G06F 9/455* (2006.01)
(52) U.S. Cl.
CPC ... *G06F 9/45558* (2013.01); *G06F 2009/4557* (2013.01); *G06F 2009/45583* (2013.01); *G06F 2009/45591* (2013.01)
(58) Field of Classification Search
None
See application file for complete search history.

(56) References Cited

U.S. PATENT DOCUMENTS

| 8,661,434 B1* | 2/2014 | Liang | G06F 9/45558 709/220 |
| 2005/0268298 A1* | 12/2005 | Hunt | G06F 9/4856 718/1 |
| 2010/0005465 A1* | 1/2010 | Kawato | G06F 9/455 718/1 |
| 2012/0131576 A1 | 5/2012 | Hatta et al. | |
| 2015/0120928 A1* | 4/2015 | Gummaraju | H04L 67/1008 709/226 |

FOREIGN PATENT DOCUMENTS

| JP | 2010-218307 | 9/2010 |
| JP | 2012-108816 | 6/2012 |
| JP | 2012-198631 | 10/2012 |
| WO | WO 2008/062864 | 5/2008 |

* cited by examiner

*Primary Examiner* — Sisley Kim
(74) *Attorney, Agent, or Firm* — Staas & Halsey LLP

(57) ABSTRACT

Plural virtual machines are executed by plural information processing devices coupled to each other via a network and connected to plural storage devices, where each information processing device executes one or more virtual machines by using a processor thereof. When first virtual machines used for distributed processing are created, a management device monitors a utilization ratio of the processor used for each of the first virtual machines, a first communication volume used for an access of each of the first virtual machines to one of the plural storage devices, and a second communication volume used for arithmetic processing of each of the first virtual machines performed on data stored in the plural storage devices. The management device controls a migration of each of the first virtual machines between the plural information processing devices, based on the utilization ratio of the processor, the first communication volume, and the second communication volume.

8 Claims, 11 Drawing Sheets

FIG. 3

| | CPU UTILIZATION | HDFS COMMUNICATION VOLUME | MapReduce COMMUNICATION VOLUME |
|---|---|---|---|
| HDFS WRITE | LOW | LARGE | SMALL |
| HDFS READ | HIGH | SMALL | SMALL |
| Map PROCESSING | | | |
| Reduce PROCESSING | | | |
| Shuffle & Sort | MIDDLE | SMALL | LARGE |
| IDLE TIME | LOW | SMALL | SMALL |

FIG. 5

| PROCESSING STATE | CPU UTILIZATION (%) | HDFS COMMUNICATION VOLUME (MB/s) | MapReduce COMMUNICATION VOLUME (MB/s) |
|---|---|---|---|
| HDFS WRITE/READ | LESS THAN 5% | 30 OR MORE | LESS THAN 1 |
| MapReduce | 45% OR MORE | LESS THAN 5 | LESS THAN 5 |
| Shuffle & Sort | LESS THAN 10% | LESS THAN 1 | 30 OR MORE |

113a

| HOST NAME | VM | CPU UTILIZATION |
|---|---|---|
| Host #1 | Hadoop VM #1 | 49% |
| Host #1 | ... | ... |
| Host #2 | Hadoop VM #2 | 47% |
| Host #2 | ... | ... |
| Host #3 | Hadoop VM #3 | 8% |
| Host #3 | Hadoop VM #4 | 5% |
| ... | ... | ... |

FIG. 7

| | CPU UTILIZATION (%) | HDFS COMMUNICATION VOLUME (MB/s) | MapReduce COMMUNICATION VOLUME (MB/s) | PROCESSING STATE |
|---|---|---|---|---|
| Hadoop VM #1 | 2 | 245 | 0 | HDFS READ/WRITE |
| Hadoop VM #2 | 1 | 182 | 0 | HDFS READ/WRITE |
| Hadoop VM #3 | 4 | 231 | 0 | HDFS READ/WRITE |
| Hadoop VM #4 | 3 | 207 | 0 | HDFS READ/WRITE |

113c

| | CPU UTILIZATION (%) | HDFS COMMUNICATION VOLUME (MB/s) | MapReduce COMMUNICATION VOLUME (MB/s) | PROCESSING STATE |
|---|---|---|---|---|
| Hadoop VM #1 | 47 | 1 | 3 | MapReduce |
| Hadoop VM #2 | 49 | 0 | 8 | MapReduce |
| Hadoop VM #3 | 48 | 1 | 1 | MapReduce |
| Hadoop VM #4 | 50 | 1 | 2 | MapReduce |

113c

SYSTEM AND METHOD FOR CONTROLLING VIRTUAL-MACHINE MIGRATIONS BASED ON PROCESSOR USAGE RATES AND TRAFFIC AMOUNTS

CROSS-REFERENCE TO RELATED APPLICATION

This application is based upon and claims the benefit of priority of the prior Japanese Patent Application No. 2014-071965, filed on Mar. 31, 2014, the entire contents of which are incorporated herein by reference.

FIELD

The embodiment discussed herein is related to system and method for controlling virtual-machine migrations based on processor usage rates and traffic amounts.

BACKGROUND

In recent years, in an increasing number of cases, large volumes of data are processed. Processing capacity of information processing devices used for data processing has been also greatly improved. However, when a single information processing device is caused to perform processing of large volumes of data, it takes a very long time to perform the processing. Therefore, when it is required that processing of large volumes of data is performed in a shorter time, normally, distributed processing in which a plurality of information processing devices are caused to perform data processing in parallel is employed.

Currently, in an increasing number of cases, a plurality of virtual machines (VMs) are created on a high-performance information processing device. This is because the following advantages are achieved: virtual machines do not interfere one another; any operating system (OS) and software may be employed; and the number of information processing devices that are to be used may be reduced. Each virtual machine may be used as a single information processing device (a node) that is caused to perform distributed processing.

In distributed processing, data is allocated to each node, and processing that is to be performed using the allocated data is specified. As such a distributed processing platform, for example, Hadoop may be used.

Hadoop is an open source implement of MapReduce, which is a distributed parallel processing framework, and a distributed file system (Hadoop File System or HDFS). In Hadoop, data is divided into data blocks and nodes are divided into master nodes and slave nodes.

A master node determines a task that is to be allocated to each slave node and requests the slave node to process the determined task. Thus, actual data processing is performed by the slave node. Therefore, in distributed processing using Hadoop, increase in data volume may be addressed by increasing the number of slave nodes.

In a VM environment in which virtual machines are created on a plurality of information processing devices, normally, each of the master node and the slave node is built on a single virtual machine. Unless specifically stated otherwise, both of the "master node" and the "slave node" shall herein be used as a term representing a "node" built on a virtual machine.

Each slave node (task tracker) executes a task (processing) by using allocated data. In order to obtain allocated data, in many cases, data communication between information processing devices is performed. As the volume of data that is to be communicated between information processing devices increases, the processing time required for completing execution of a task increases. From this reason, normally, in scheduling (which herein includes placement (allocation) of data) in which a task is allocated to each slave node, it is taken into consideration that a time spent for communication between the information processing devices is reduced. By reducing the time spent for communication between the information processing devices, a processing time of entire distributed processing may be also reduced.

In reality, even when data block placement and task allocation are optimally performed on each slave node, the processing time of entire distributed processing is long. In future, it is expected that, in many cases, a VM environment will be used for distributed processing. Data that is to be processed will be certainly increased in size in the future. Therefore, it will be important to enable distributed processing that is to be executed in a VM environment, to be performed at higher speed.

Related techniques are disclosed in Japanese Laid-open Patent Publication No. 2010-218307, International Publication Pamphlet No. WO 2008-062864, Japanese Laid-open Patent Publication No. 2012-108816, and Japanese Laid-open Patent Publication No. 2012-198631.

SUMMARY

According to an aspect of the invention, a system includes a plurality of information processing devices coupled to each other via a network, and a plurality of storage devices connected to the plurality of information processing devices. Each of the plurality of information processing devices executes one or more virtual machines by using a processor thereof. When a plurality of first virtual machines, which are included in the plurality of virtual machines and used for distributed processing, are created, a management device, which is one of the plurality of information processing devices, monitors a utilization ratio of the processor used for executing each of the plurality of first virtual machines, a first communication volume used for an access of each of the plurality of first virtual machines to one of the plurality of storage devices, and a second communication volume used for arithmetic processing of each of the plurality of first virtual machine performed on data stored in the plurality of storage devices. The management device controls a migration of each of the plurality of first virtual machines between the plurality of information processing devices, based on the utilization ratio of the processor, the first communication volume, and the second communication volume.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a usage state of a resource of a slave node in accordance with processing being executed, according to an embodiment;

FIG. 5 is a diagram illustrating an example of processing state determination information, according to an embodiment;

FIG. 7 is a diagram illustrating an example of a processing state determination table, according to an embodiment;

DESCRIPTION OF EMBODIMENT

An embodiment will be described below with reference to the accompanying drawings.

Figure 1:
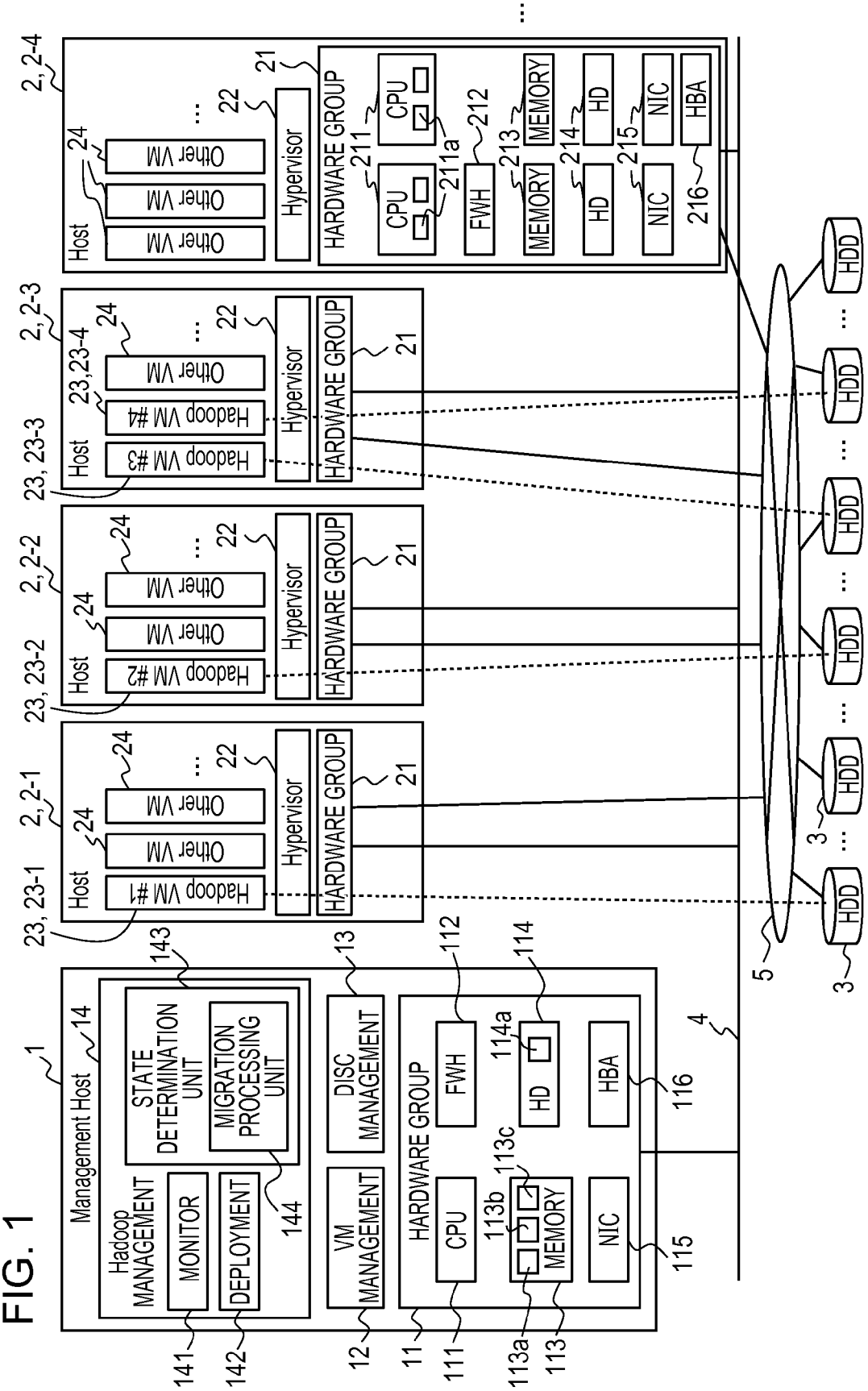
FIG. 1 is a diagram illustrating a configuration example of an information processing system, according to an embodiment.

FIG. 1 is a diagram illustrating a configuration example of an information processing system, according to an embodiment. The information processing system according to the embodiment is, for example, a system built in a data center that provides a cloud service. As illustrated in FIG. 1, the information processing system includes a management host computer (which is denoted by "Management Host" in FIG. 1 and will be hereinafter referred to as a "management host") 1, a plurality of host computers (each of which is denoted by "Host" in FIG. 1 and will be hereinafter referred to as a "host") 2 (2-1 to 2-4), a plurality of hard disk drives (each of which is denoted by "HDD") 3, a local area network (LAN) 4, and a disk area network (DAN) 5.

The management host 1 and each host 2 are connected to LAN 4. Thus, the management host 1 and each host 2 are enabled to perform communication via LAN 4.

DAN 5 is a network used for providing connection between each host 2 and each hard disk drive 3. DAN 5 limits, for each host 2, the hard disk drives 3 which the host 2 may access.

Each host 2 includes a hardware group 21, and a hypervisor 22 and virtual machines 23 and 24 operate on the hardware group 21. In FIG. 1, the virtual machine 23 that functions as a slave node that performs distributed processing using Hadoop is distinguished from other virtual machines 24 other than the virtual machine 23, by denoting the virtual machine 23 and the other virtual machines 24 by "Hadoop VM" and "Other VM", respectively. Hereinafter, the virtual machine 23 will be referred to as a "Hadoop virtual machine 23" and the virtual machines 24 will be referred to as "other virtual machines 24". No reference character is given to a virtual machine that is not particularly distinguished.

The hardware group 21 of each host 2 includes a central processing unit (CPU) 211, a firm-ware hub (FWH) 212, a plurality of memories (memory modules) 213, a plurality of hard disk drives (each of which is denoted by "HD" in FIG. 1) 214, a plurality of network interface cards (NIC) 215, and a host bus adapter (HBA) 216. A plurality of CPU cores 211a are mounted on CPU 211. FIG. 1 merely illustrates an example, and the configuration of the hardware group 21 is not limited to the example illustrated in FIG. 1.

A firm-ware is stored in FWH 212, and OS, an application program (which will be hereinafter abbreviated to an "application"), various types of data, and the like, are stored in the hard disk drives 214. The hypervisor 22 is a program which is a part of the firm-ware, virtualizes the hardware group 21, and enables parallel execution of a plurality of OSs (virtual machines).

When power is turned on, CPU 211 reads out the firm-ware stored in FWH 212 to the memory 213 and executes the read-out firm-ware. Thus, the hypervisor 22 of the firm-ware is executed, and a state where a virtual machine may be created is achieved. Creation of a virtual machine and resource allocation to a virtual machine that is to be created are managed by the management host 1.

The management host 1 is a management device according to the embodiment, and manages creation of a virtual machine in each host 2 and placement of the created virtual machine. In order to manage placement of the virtual machine, the management host 1 causes live-migration in which a virtual machine is migrated to another host 2 to be executed without stopping the Hadoop virtual machine 23 in operation, as appropriate.

As illustrated in FIG. 1, the management host 1 includes a hardware group 11, and the hardware group 11 realizes a VM management unit 12, a disk management unit 13, and a Hadhoop management unit 14. The hardware group 11 includes CPU 111, FWH 112, a memory 113, a hard disk drive 114, NIC 115, and HBA 116.

In addition to an operating system (OS), an application program (which will be hereinafter referred to as a "VM management software") 114a used for causing a computer to function as the management host 1 is stored in the hard disk drive 114. The VM management software 114a is a program that is started by CPU 111, following the firm-ware stored in the FWH 112 and OS. CPU 111 executes the VM management software 114a, thereby realizing the VM management unit 12, the disk management unit 13, and the Hadhoop management unit 14.

The VM management unit 12 manages creation of a virtual machine and resource allocation to a management machine that is caused to create a virtual machine, and monitors a virtual machine in operation. The host 2 that has started the firm-ware creates a virtual machine that is to be created in accordance with an instruction transmitted from the VM management unit 12.

A media access control (MAC) address and an Internet protocol (IP) address are allocated to each virtual machine. DAN 5 limits, for each virtual machine as a unit, the hard disk drives 3 that are to be made accessible. The disk management unit 13 controls DAN 5 and manages the hard disk drives 3 that allow the virtual machine to access thereto. In FIG. 1, each dashed line connecting the corresponding one of the Hadoop virtual machines 23 and the corresponding one of the hard disk drives 3 indicates, for each Hadoop virtual machine 23, the hard disk drive 3 that the Hadoop virtual machine 23 may access.

The Hadhoop management unit 14 manages deployment (creation) of the Hadoop virtual machine 23, and live-migration of the Hadoop virtual machine 23 in operation.

The Hadhoop management unit 14 includes a monitor unit 141, a deployment unit 142, and a state determination unit 143.

The deployment unit 142 controls the VM management unit 12 to cause the host 2, which is to be caused to create the Hadoop virtual machine 23, to create the Hadoop virtual machine 23. Thus, the deployment unit 142 deploys the Hadoop virtual machine 23, which is to be used, on each host 2.

The monitor unit 141 monitors various state quantities for the Hadoop virtual machine 23 as a target. The state quantities that are monitored are CPU utilization and communication volume. The VM management unit 12 monitors, for each host 2, the usage condition of a resource. The monitor unit 141 obtains, from the VM management unit 12, information (which will be hereinafter referred to as "resource usage condition information") indicating the usage condition of a resource. The resource usage condition information is transmitted from the hypervisor 22 of each host 2.

The state determination unit 143 obtains, from the monitor unit 141, for each Hadoop virtual machine 23, information (which will be hereinafter referred to as "state quantity information") that indicates various state quantities, and the processing sate of the Hadoop virtual machine 23 is determined. In the embodiment, a determination result of the processing state is used in live-migration of the Hadoop virtual machine 23. In order to control the live-migration, the state determination unit 143 includes a migration processing unit 144.

Figure 2:
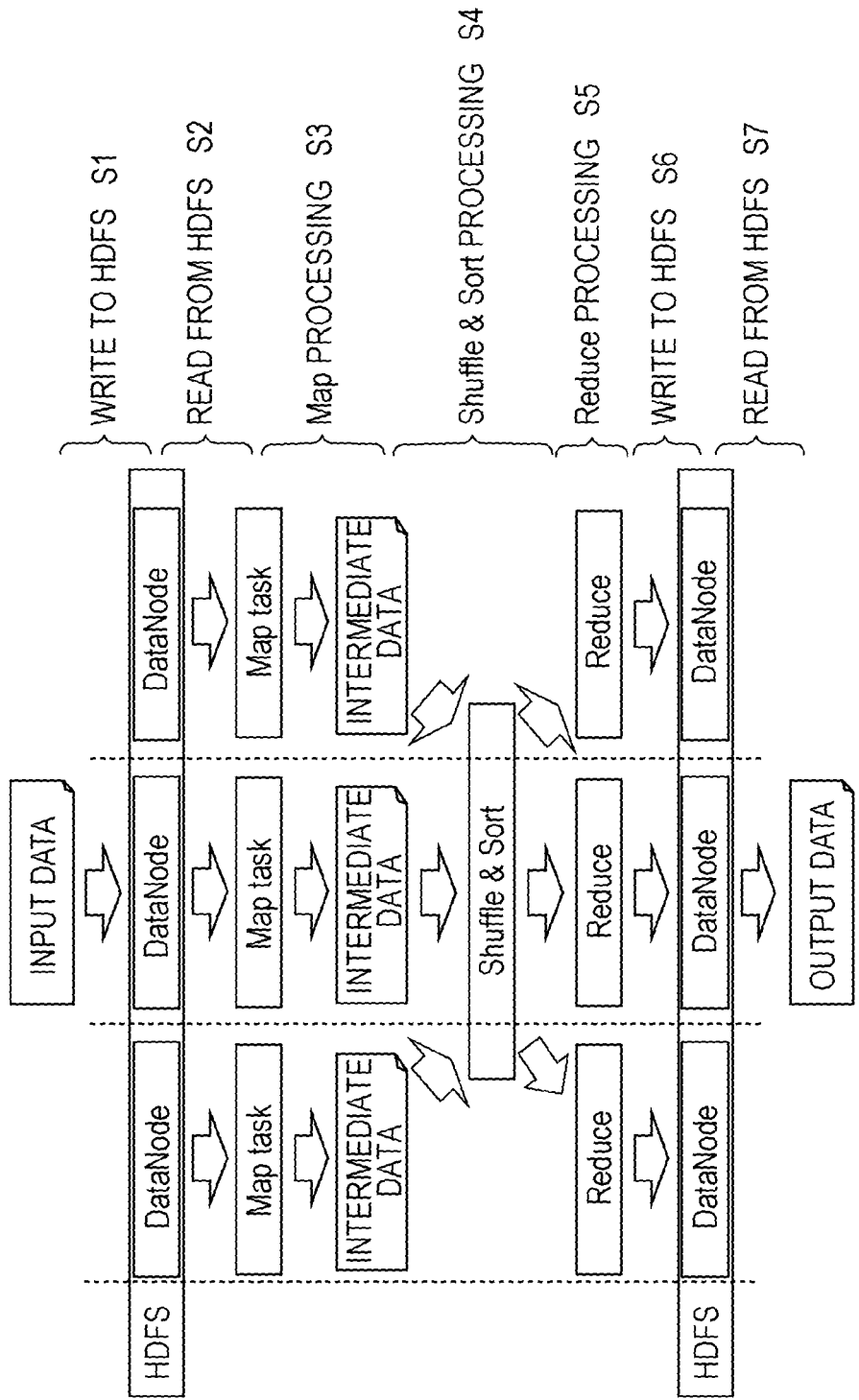
FIG. 2 is a diagram illustrating an example of an operational flow of MapReduce processing, according to an embodiment.

FIG. 2 is a diagram illustrating an example of an operational flow of MapReduce processing, according to an embodiment. Before describing the management host 1 in more detail, MapReduce processing realized by Hadoop and an operational flow of MapReduce processing will be specifically described with reference to FIG. 2.

In MapReduce processing, data processing is performed in two separate stages, that is, map processing and reduce processing. Data is handled in combination of a key and a value as a pair. Map processing is processing in which the pair is processed to generate intermediate data of the key and the value. Reduce processing is processing in which the intermediate data is processed and the processed data is tallied up.

Figure 4:
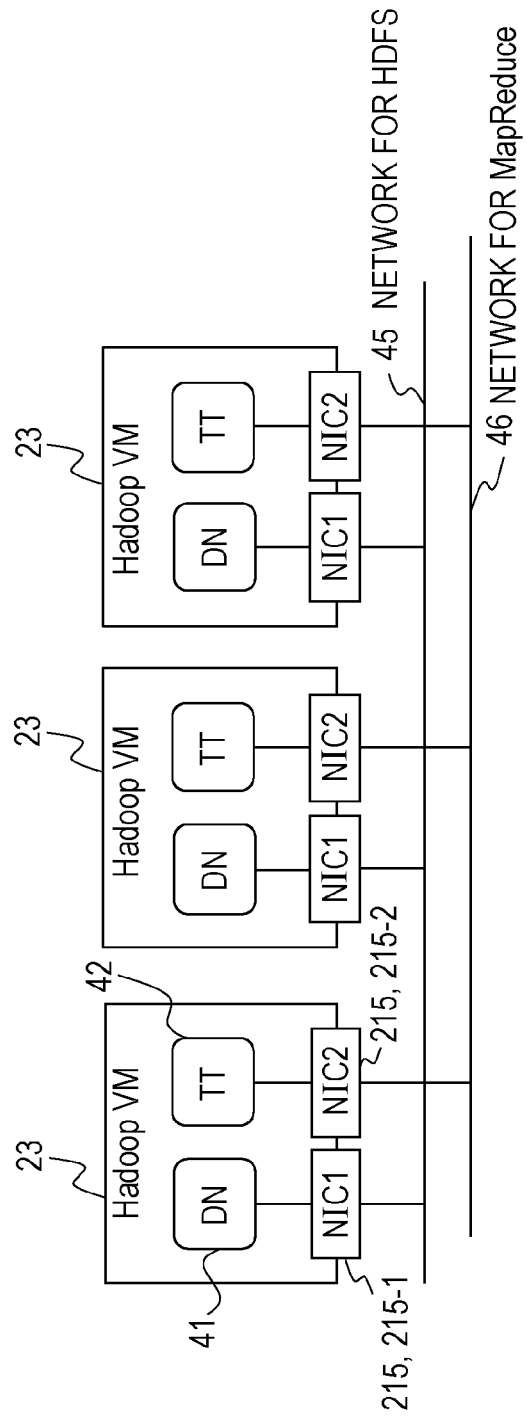
FIG. 4 is a diagram illustrating an example of a method for measuring various communication volumes, according to an embodiment.

In Hadoop, MapReduce processing is executed by a task tracker. The task tracker is a program executed in each slave node (in this case, each Hadoop virtual machine 23). In each slave node, in addition to the task tracker, a data node operates (FIG. 4). Data used by the task tracker in Map processing is provided by the data node. HDFS, which is a distributed file system of Hadoop, is formed by a cluster of data nodes.

In FIG. 2, data nodes are separated by dotted lines. This is because data nodes operate on different slave nodes from one another. Thus, each dotted line indicates a boundary between slave nodes. Based on this, FIG. 2 illustrates an example where three slave nodes are caused to execute MapReduce processing.

In the embodiment, targets of live-migration are only slave nodes. Therefore, in FIG. 2 and FIG. 1, only the Hadoop virtual machines 23 of the slave nodes are illustrated.

A client that requests distributed processing provides input data. The input data is divided in units of block, and the data node of each slave node stores allocated data in an accessible storage device (the hard disk drive 3 in the configuration example in FIG. 1) (S1). Thereafter, the data node of each slave node reads out the data stored in the storage device for Map processing (S2). Thus, the task tracker of each slave node executes Map processing using the read-out data (S3). Due to the execution of Map processing, intermediate data is generated. In this intermediate data, the key and the value are updated with a new key and a new value.

Shuffle & Sort processing, in which keys and values are collected and sorted by the task tracker of each slave node for each pair having the same keys, is executed on the generated intermediate data (S4). Thereafter, the task tracker of each slave node executes Reduce processing for tallying up data having the same key (S5).

An execution result of Reduce processing is stored on the storage device by the data node on the same slave node (S6). When it is unnecessary to further perform Map processing, an execution result of Reduce processing stored on each storage device is output as output data, which is a final processing result (S7).

When it is necessary to further perform Map processing, Map processing is executed after an execution result of each Reduce processing is obtained. Therefore, the slave nodes are synchronized with each other by Reduce processing.

Distributed processing using Hadoop is executed in accordance with an operational flow illustrated in FIG. 2. When an access of the data node to the storage device, that is, data write to the storage device or data read from the storage device, is performed, a communication volume (which will be hereinafter referred to as a "HDFS communication volume") is relatively large due to accessing the storage device. However, a load of CPU for communication is relatively small. Therefore, CPU utilization becomes relatively low.

MapReduce processing, that is, Map processing and Reduce processing, is data processing executed by CPU. Therefore, the CPU utilization is relatively high. Since an access to the storage device is not often made, the HDFS communication volume is relatively small. The task tracker does not often perform communication with another slave node, and thus, the communication volume (which will be hereinafter referred to as a "MapReduce communication volume") in communication with another slave node is relatively small.

In Shuffle and Sort processing, a determination of the type of a pair (a record) is made, and data used for the determination is obtained from another slave node. Therefore, although not as high as the CPU utilization in MapReduce processing, the CPU utilization is relatively high. The MapReduce communication volume is relatively large. Since an access to the storage device is not often made, the HDFS communication volume is relatively small.

While an idling operation is performed, for example, for waiting for processing of another slave node to end, or the like, the CPU utilization is low, and both of the HDFS communication volume and the MapReduce communication volume are small.

FIG. 3 is a diagram illustrating an example of a usage state of resources of a slave node in accordance with processing being executed, according to an embodiment.

As described above, the usage state of resources of a slave node varies depending on processing being executed. Therefore, in Hadoop, as illustrated in FIG. 3, the CPU utilization, the HDFS communication volume, and the MapReduce communication volume vary depending on processing being executed by the slave node. Therefore, in the embodiment, the monitor unit 141 is caused to monitor the CPU utilization, the HDFS communication volume, and the MapReduce communication volume, as various state quantities.

Conventionally, live-migration of a virtual machine is performed in accordance with a problem that has occurred on an information processing device in which the virtual machine is created, the usage state of resources, or the like. In a condition where the CPU utilization is high and it is presumed that the operation of the virtual machine is highly likely to be affected, one or more virtual machines are migrated to another information processing device. In contrast, in the embodiment, the Hadoop virtual machine 23 is migrated, as appropriate, so as to enable distributed processing to be executed at higher speed.

For example, in Shuffle & Sort processing, the communication volume between the slave nodes is relatively large. This indicates that, in a configuration example illustrated in FIG. 1, the communication volume between the hosts 2 via the LAN 4 is relatively large.

Communication via the LAN 4 has an aspect in which realization of high-speed processing is disturbed. However, communication between virtual machines created on the same host 2 may not be performed via the LAN 4. This is because communication via a virtual path built in the host 2 is possible.

Communication via the virtual path is performed at much higher speed than the speed of communication via the LAN 4. Therefore, when communication via the virtual path is enabled, specifically, it is possible to end Shuffle & Sort processing in short time. In the embodiment, with focus on the forgoing, a communication time spent for MapReduce communication is shortened by using the virtual path, thereby enabling high-speed execution of distributed processing. For this reason, live-migration is performed.

In a master node, MapReduce processing is not executed. The master node monitors each slave node and instructs each slave node to execute processing. Therefore, unlike the slave nodes, the usage state of a resource does not greatly vary. Therefore, the master node is removed from targets of live-migration.

In the embodiment, separately from the master node, the management host 1 is provided, and is caused to control live-migration of the Hadoop virtual machine 23. This is for the purpose of realizing execution of distributed processing at higher speed without performing an update of the existing Hadoop. Since it is unnecessary to perform the update of the existing Hadoop, higher quality services may be provided to more customers.

When a single Hadoop virtual machine 23 was created for each of twelve hosts 2 and benchmark in which random data (input data) of 1 terabyte (TB) was sorted was executed, it took 144 minutes to execute the benchmark. About 30%, that is, 40 minutes, of the entire execution time of 144 minutes, was for Shuffle & Sort processing.

The communication speed in communication via the LAN 4 is, for example, 1 to 10 gigabits per second (Gbps), and the communication speed in communication via the virtual path within the host 2 is, for example, 5 to 20 Gbps. Therefore, when the Hadoop virtual machines 23 are integrated on a single host 2 and a time spent for data communication is reduced to 1/10, the entire execution time is 104 (=144−36 (=40−4)). A migration time spent for live-migration of a single Hadoop virtual machine 23 is about 7 minutes, if data of 48 gigabyte (GB) is transferred via 1 Gbps LAN 4. If the data of 48 GB is transferred via 10 Gbps LAN 4, the migration time is a little over 1 minute.

There are cases where live-migrations may be performed in parallel. However, even when live-migration is performed individually for each of the Hadoop virtual machines 23, assuming that the communication speed of LAN 4 is 10 Gbps, all of live-migrations are ended in about 15 minutes. Considering an overhead due to this live-migration, the entire execution time is 109 (=104+15) minutes. Therefore, overall, reduction in processing time by about 25 ((1−109/144)×100)% may be achieved.

The entire execution time greatly depends on, in addition to the communication speed of LAN 4 and the communication speed of the virtual path, the size of input data, the performance of the hard disk drive 3, and the like. The entire execution time also depends on the number of Hadoop virtual machines 23 that are to be created. However, the entire execution time may be greatly reduced by using live-migration to further increase the speed of data communication between the Hadoop virtual machines 23, and the like.

FIG. 4 is a diagram illustrating an example of a method for measuring various communication volumes, according to an embodiment.

A data node 41 and a task tracker 42 operate on each Hadoop virtual machine 23. The data node (denoted by "DN" in FIG. 4) 41 and the task tracker (denoted by "TT" in FIG. 4) 42 are caused to perform communication using different networks 45 and 46, respectively. Therefore, different NICs 215-1 and 215-2 are coupled to the networks 45 and 46, respectively. As a result, the communication volumes of NICs 215-1 and 215-2 are caused to be individually monitored, and thus, the HDFS communication volume and the MapReduce communication volume are separately measured.

In this method, only the Hadoop virtual machine 23 may be set without adding any special function to the hypervisor 22, and the like. The configuration example illustrated in FIG. 1 is built on the assumption of this method. In the configuration example illustrated in FIG. 1, the network 45 corresponds to DAN 5, and the network 46 corresponds to LAN 4.

The method for measuring various communication volumes is not limited to the example illustrated in FIG. 4. For example, the hypervisor 22 may be configured to tally up the communication volume individually for each of the data node 41 and the task tracker 42 by causing the hypervisor 22 to confirm a destination port and a source port. When communication between the Hadoop virtual machines 23 is performed via the virtual path in the host 2, this method may be used. Another method may also be used.

In order to more effectively reduce the processing time (the entire processing time) of the entire distributed processing, a determination of processing (a processing state) being executed by the Hadoop virtual machine 23, which is each slave node, is made. Therefore, in the embodiment, the state determination unit 143 is caused to determine the processing state of each Hadoop virtual machine 23, and the migration processing unit 144 is caused to perform live-migration, as appropriate.

The state determination unit 143 is configured such that the monitor unit 141 notifies the state determination unit 143 of various state quantities, that is, the CPU utilization, the HDFS communication volume, and the MapReduce communication volume, for each Hadoop virtual machine 23. The state determination unit 143 determines the processing state for each Hadoop virtual machine 23 by using the various state quantities of which the monitor unit 141 have notified the state determination unit 143, with reference to information (which will be hereinafter referred to as "processing state determination information") used for processing state determination.

FIG. 5 is a diagram illustrating an example of processing state determination information, according to an embodiment. The processing state determination information is, for example, information which is stored in the memory 113 and to which is referred, and is denoted by the reference characters 113a in FIG. 1.

As illustrated in FIG. 5, in the processing state determination information 113a, the processing state is divided largely into three categories, that is, an access (denoted by "HDFS WRITE/READ" in FIG. 5) of the data node 41 to the hard disk drive 3, MapReduce processing performed by the task tracker 42, and Shuffle and Sort processing. The processing state determination information 113a indicates, for each of the categories into which the processing state is divided, criteria for various state quantities, that is, the CPU utilization, the HDFS communication volume, and the MapReduce communication volume, which are to be satisfied when determining the processing state. Thus, the state determination unit 143 determines the processing state of each Hadoop virtual machine 23, with reference to the processing state determination information 113a, using the CPU utilization, the HDFS communication volume, and the MapReduce communication volume of which the monitor unit 141 has notified the state determination unit 143.

In allocation of resources to a virtual machine, there are cases where resources are allocated to a single virtual machine in units of CPUs or CPU cores. In live-migration, a virtual machine is required to be migrated to an information processing device having a capacity to execute a virtual machine. Therefore, in the embodiment, the CPU utilization is set to be a value obtained by normalizing the CPU utilization by regarding the maximum CPU utilization of the entire host 2 as 100%.

Even when resources that are to be allocated to a single Hadoop virtual machine 23 are all the same, the processing state determination information 113a is prepared for each host 2 as long as the contents of the hardware group 21 are different for each host 2. In the case, in order not to cause confusion, it is assumed that the contents of the hardware group 21 are the same for all of the hosts 2. As for CPU 211 included in the hardware group 21, it is assumed that only a single CPU 211 including four CPU cores 211a therein is provided. It is assumed that, as for allocation of CPU 211 to a single Hadoop virtual machine 23, two CPU cores 211a are allocated at maximum. Therefore, "45%" provided as a specific value for the CPU utilization in FIG. 5 indicates that the load of the CPU core 211a is very large.

The state determination unit 143 determines the processing state for each Hadoop virtual machine 23 using a processing state determination table 113c, which is information to be stored in the memory 113. FIG. 7 is a diagram illustrating an example of a processing state determination table, according to an embodiment.

As illustrated in FIG. 7, the processing state determination table 113c is a table in which a set of information including the CPU utilization, the HDFS communication volume, the MapReduce communication volume, and the determined processing state is stored as an entry (a record) for each Hadoop virtual machine 23. The processing state determination table 113c is created, for example, by monitor unit 141, and is updated, for example, by the monitor unit 141 and the state determination unit 143. More specifically, the CPU utilization, the HDFS communication volume, and the MapReduce communication volume are updated by the monitor unit 141, and the processing state is updated by the state determination unit 143. In such a case, the monitor unit 141 notifies the state determination unit 143 of various state quantities via the processing state determination table 113c.

The migration processing unit 144 selects the Hadhoop virtual machine 23 on which live-migration is to be performed, and also selects the host 2 that is to be set as a destination to which the selected Hadoop virtual machine 23 is migrated, by using the determination result for the processing state of each Hadhoop virtual machine 23. The management host 1 holds a host-virtual machine management table 113b in the memory 113 so that whether or not the Hadoop virtual machine 23 may be migrated is determined. The host-virtual machine management table 113b is created and updated by the VM management unit 12.

Figure 6:
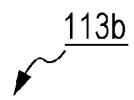
FIG. 6 is a diagram illustrating an example of a host-virtual machine management table, according to an embodiment.

FIG. 6 is a diagram illustrating an example of a host-virtual machine management table, according to an embodiment. The host-virtual machine management table 113b is a table indicating, for each host 2, a virtual machine created on the each host 2 and the CPU utilization of the virtual machine. Thus, the migration processing unit 144 refers to the host-virtual machine management table 113b, determines whether or not live-migration of the Hadoop virtual machine 23 is to be performed, and also determines the host 2 that is to be set as a destination of the Hadoop virtual machine 23, and the like.

In FIG. 6, information indicating the usage condition of resources includes only the CPU utilization. This is because it is assumed that CPU 211 is a resource that is to be considered most when live-migration of the Hadoop virtual machine 23 is performed. A resource that is to be considered may be determined, as appropriate, in accordance with the hardware group 21 of the host 2, a virtual machine that is to be created, and the like, and therefore, is not specifically limited.

Figure 8:
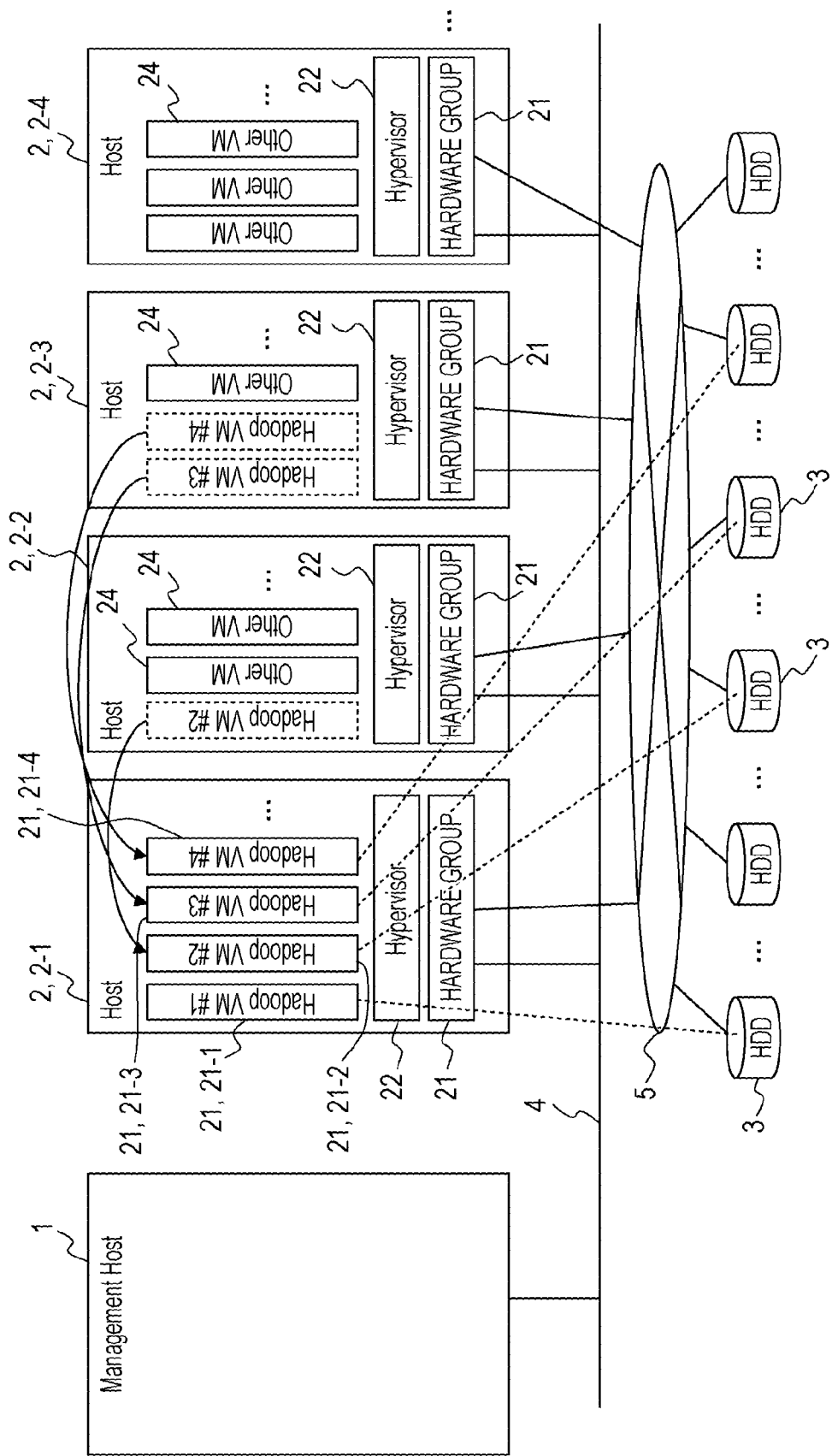
FIG. 8 is a diagram illustrating an example of live-migration of a Hadoop virtual machine performed in accordance with a processing state, according to an embodiment.

Deployment of each Hadoop virtual machine 23 illustrated in FIG. 1 is an initial deployment after each host 2 created the Hadoop virtual machine 23. It is an access for writing data to the hard disk drive 3 that each Hadoop virtual machine 23 first executes in the state of the initial deployment (FIG. 2). Therefore, the contents of the processing state determination table 113c is updated as illustrated in FIG. 7, and the migration processing unit 144 is caused to perform live-migration of the Hadoop virtual machine 23 as illustrated in FIG. 8 such that as many Hadoop virtual machines 23 as possible are integrated on a single host 2.

The reason why the Hadoop virtual machines 23 are integrated on a single host 2 is that, the access speed to the hard disk drive 3 may be maintained by employing DAN 5 and a virtual path may be used for communication between the Hadoop virtual machines 23. In order to enable integration of as many Hadoop virtual machines 23 as possible, in the embodiment, allocation of CPU 211 is changed from allocating two CPU cores 211a to allocating a single CPU core 211a. Thus is because, in a condition where an access to the hard disk drive 3 is made, the CPU utilization is low. Distributed processing may be executed at higher speed by integrating as many Hadhoop virtual machines 23 as possible. The integration of the Hadoop virtual machines 23 may be limited by, in addition to limiting the hardware group 21, limiting the number of hard disk drives 3 which may be coupled to a single host 2 via DAN 5.

When the Hadoop virtual machine 23 is migrated to another host 2, the connection relationship between the hosts 2 and the hard disk drives 3 is to be changed in accordance with the migration. The migration processing unit 144 requests the disk management unit 13 to change the connection relationship, and thus, the connection relationship between the hosts 2 and the hard disk drives 3 is changed in accordance with the migration.

Figure 9:
FIG. 9 is a diagram illustrating an example of update of the contents of a processing state determination table, according to an embodiment.
Figure 10:
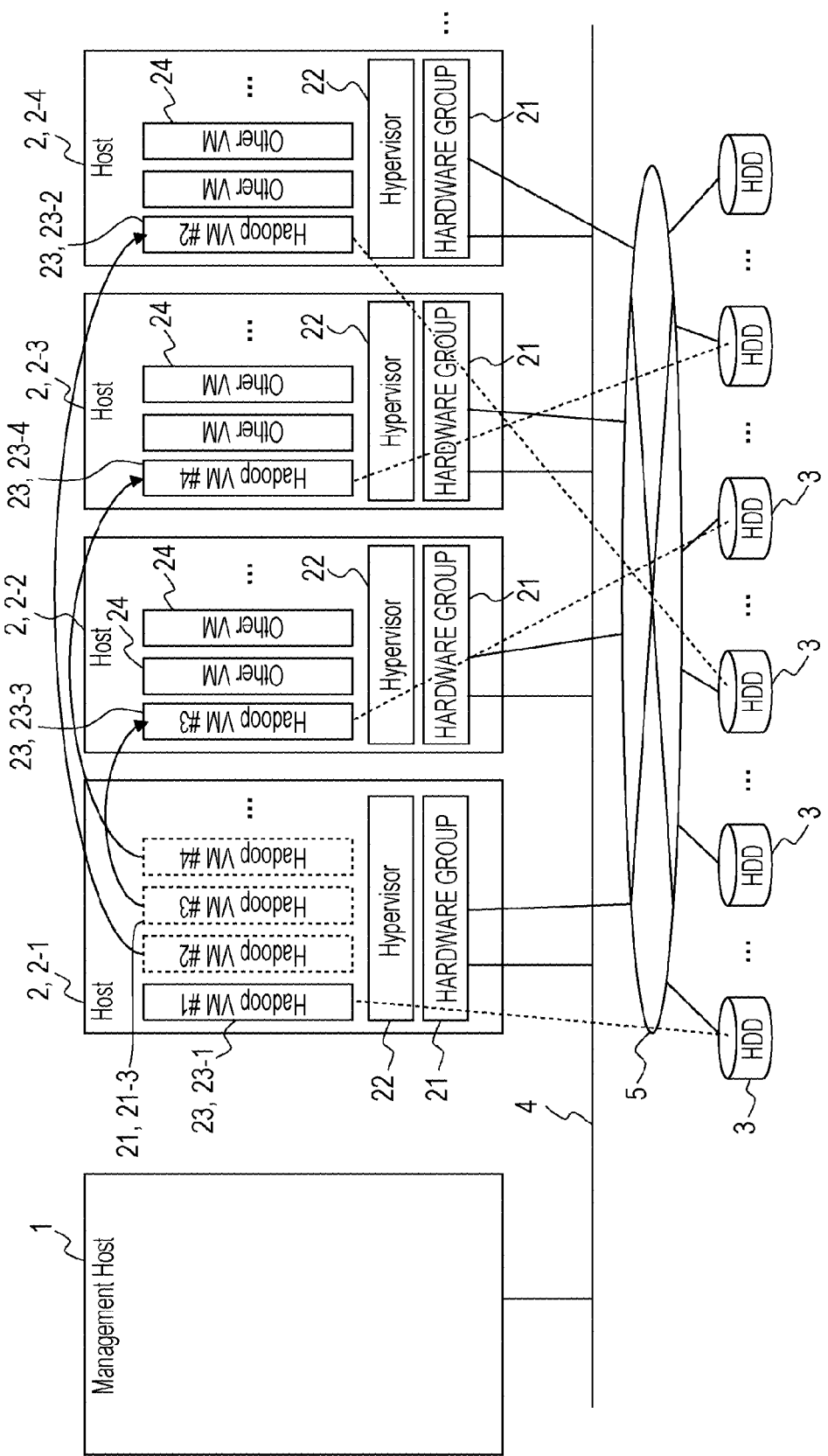
FIG. 10 is a diagram illustrating an example of live-migration of a Hadoop virtual machine performed by updating the contents of a processing state determination table, according to an embodiment.

Each Hadoop virtual machine 23 executes, after making an access for writing data to the hard disk drive 3, Map processing. In the Map processing, the CPU utilization becomes maximum or close to the maximum. Thus, the processing state determination table 113c is updated, for example, with the example contents illustrated in FIG. 9. Based on this, for example, as illustrated in FIG. 10, the migration processing unit 144 is caused to perform live-migration such that a single Hadoop virtual machine 23 is caused to operate on a single host 2. Allocation of CPU 211 is changed from allocating a single CPU core 211a to allocating two CPU cores 211a. The above-described placement of the Hadoop virtual machines 23 is basically the same, when it is determined that the processing state is Reduce processing.

When it is determined that the processing state of each Hadoop virtual machine 23 is Shuffle & Sort processing, it is presumed that data communication of a large volume is to be performed between the Hadoop virtual machines 23. Based on this, similar to the case where it is determined that the processing state is HDFS write/read, the migration processing unit 144 is caused to perform live-migration in which as many Hadoop virtual machines 23 as possible are integrated on a single host 2. Processing capacity for Shuffle & Sort processing is clearly small, as compared to the case where MapReduce processing is performed. Therefore, in the embodiment, as for allocation of CPU 211, a single CPU core 211a is allocated, and as many Hadoop virtual machines 23 as possible are integrated on a single host 2.

Figure 11:
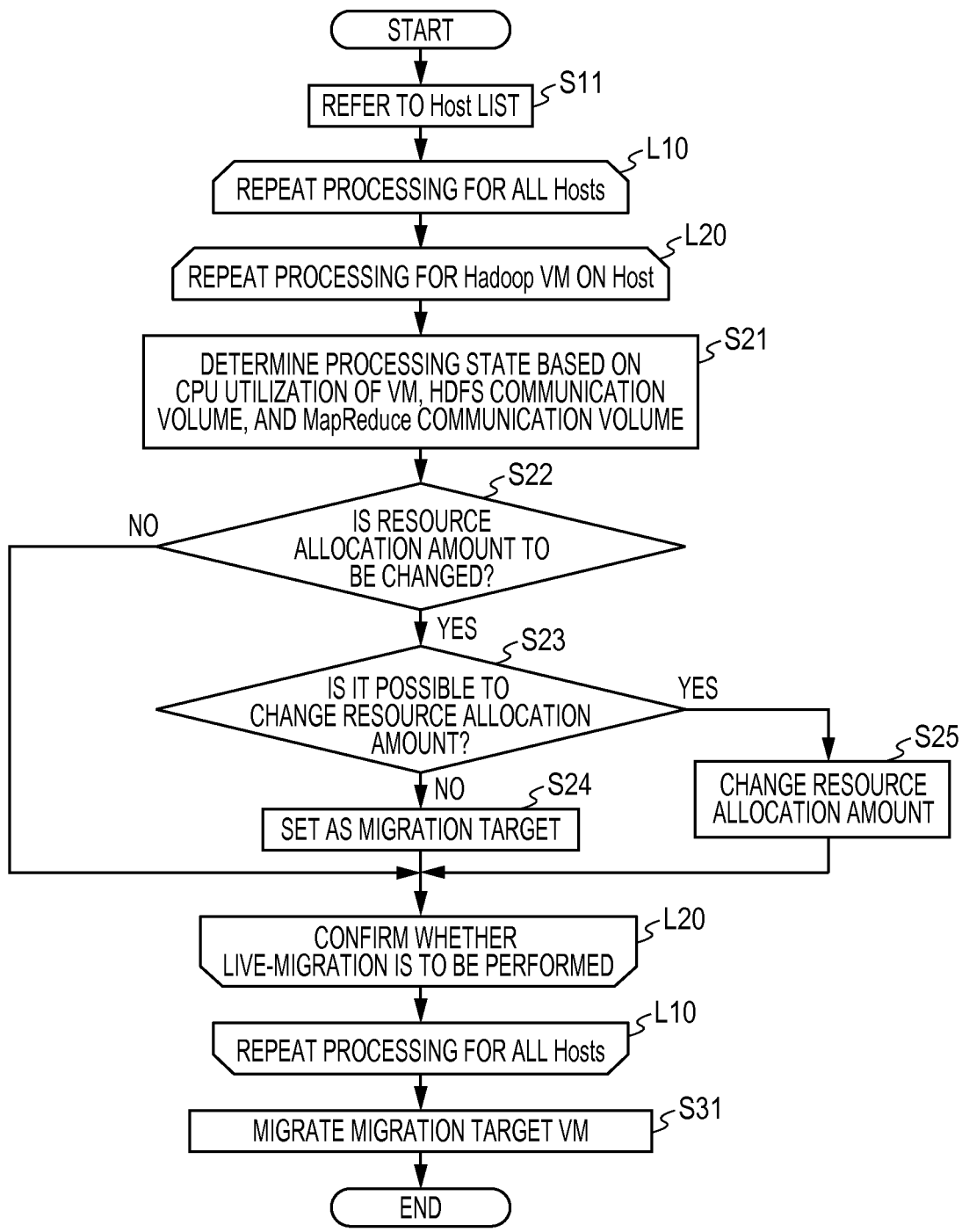
FIG. 11 is a diagram illustrating an example of an operational flowchart for VM migration control processing, according to an embodiment.

CPU 111 of the management host 1 executes VM migration control processing, an operational flowchart for which is illustrated in FIG. 11, and thus, the state determination unit 143 including the above-described migration processing unit 144 is realized. Next, VM migration control processing executed by CPU 111 will be described in detail with reference to FIG. 11.

For example, each time a certain time has elapsed or a request is received from the management host 1, each host 2 transmits resource usage condition information of each virtual machine to the management host 1. The resource usage condition information of the Hadoop virtual machine 23, which has been received by the management host 1, is notified to the state determination unit 143 via the VM management unit 12 and the monitor unit 141 of the Hadhoop management unit 14. With the notification of the resource usage condition information as a trigger, the state determination unit 143 starts operating. As mentioned above, VM migration control processing is executed upon receiving the resource usage condition information of the Hadoop virtual machine 23. The VM migration control processing is realized by causing CPU 111 to execute the above-described VM management software 114a.

First, CPU 111 confirms the host 2 whose Hadoop virtual machine 23 is in operation, with reference to the host-virtual machine management table 113b (denoted by "Host LIST" in FIG. 11) and the processing state determination table 113c (S11). Thereafter, the process proceeds to a processing loop L10.

The processing loop L10 is a series of processes performed, for each host 2, to extract the Hadoop virtual machine 23 that is to be a target of live-migration and determine a resource amount that is to be allocated to the extracted Hadoop virtual machine 23. In order to confirm all of the Hadoop virtual machines 23 on the host 2, a processing loop L20 is included in the processing loop L10. In the processing loop L20, whether or not live-migration is to be performed is confirmed, while changing the Hadoop virtual machine 23 that is to be a target among the Hadoop virtual machines 23 created on the host 2 selected in the processing loop L10.

In the processing loop L20, first, CPU 111 determines the processing state of a Hadoop virtual machine 23 that is to be a target, among Hadoop virtual machines 23 created on the selected host 2, with reference to the processing state determination table 113c (S21). In accordance with a determination result, after updating the processing state determination table 113c, CPU 111 determines whether or not the resource allocation amount for the Hadoop virtual machine 23 whose processing state has been determined is to be changed (S22).

In the embodiment, the processing state of the Hadoop virtual machine 23 is determined to be one of HDFS write/read, MapReduce processing, and Shuffle & Sort processing. When the processing state is determined in such a manner, the processing state of the Hadoop virtual machine 23 transitions from HDFS write/read to MapReduce processing, to Shuffle & Sort processing, and to HDFS write/read, as illustrated in FIG. 2. In the transition, the CPU resource allocation amount is caused to change, as described above, from a single CPU core 211a to two CPU cores 211a, to a single CPU core 211a, and to a single CPU core 211a. A state where the resource allocation amount is to be changed indicates that the Hadoop virtual machine 23 whose processing state has been determined is a candidate for a target on which live-migration is to be performed. Thus, when the Hadoop virtual machine 23 is a candidate for a target on which live-migration is to be performed, a result of determination in S22 is YES, and the process proceeds to S23. When the Hadoop virtual machine 23 is not a candidate for a target on which live-migration is to be performed, a result of the determination in S22 is NO, and the series of processes in the processing loop L20 ends.

When there is any other Hadoop virtual machine 23, for which whether live-migration is to be performed is confirmed, remaining on the target host 2, in the processing loop L20, a single Hadoop virtual machine 23 is selected as a target from the Hadoop virtual machines 23 remaining on the host 2. When there is not any other Hadoop virtual machine 23, for which whether live-migration is to be performed is to be confirmed, remaining, the processing loop L20 ends. When the processing loop L20 ends, the process returns to the processing loop L10, and whether or not there is any target host 2 remaining is confirmed. When there is any target host 2 remaining, a single host 2 is selected as a target from the hosts 2 remaining, and the processing loop L20 is executed. When there is not any target host 2 remaining, the processing loop L10 ends, and the process proceeds to S31. Thus, by the time when the process proceeds to S31, all of the Hadoop virtual machines 23 on which live-migration is to be performed have been identified.

Depending on conditions, there may be cases where the processing state may not be determined to be any one of HDFS write/read, MapReduce processing, and Shuffle & Sort processing. When the processing state has not been determined, a result of determination in S22 is NO. Thus, the Hadoop virtual machine 23, the processing state of which has not been determined, is removed from targets on which live-migration is to be performed.

In S23, CPU 111 determines whether or not it is currently possible to change the resource allocation amount to the Hadoop virtual machine 23 whose processing state has been determined, on the host 2 being in operation. When it is not currently possible to change the resource allocation amount to the Hadoop virtual machine 23 on the host 2 being in operation, or when the Hadoop virtual machine 23 is to be migrated to another host 2, a result of determination in S23 is NO, and the process proceeds to S24. When it is currently possible to change the resource allocation amount to the Hadoop virtual machine 23 on the host 2 being in operation, and the Hadoop virtual machine 23 is not to be migrated, a result of determination in S23 is YES, and the process proceeds to S25.

In S24, CPU 111 sets the Hadoop virtual machine 23 as a migration target. Then, a series of processes in the processing loop L20 ends.

In S25, CPU 111 changes the resource allocation amount to the Hadoop virtual machine 23. Then, a series of processes in the processing loop L20 ends.

In S31, CPU 111 determines, for each Hadoop virtual machine 23 set as a migration target, the host 2 that is to be a destination, and causes the host 2 that has been determined as a target to perform live-migration in which each Hadoop virtual machine 23 is migrated. Then, the VM migration control processing ends.

For example, for Hadoop virtual machines 23 whose determined processing state is HDFS write/read or Shuffle & Sort processing, the host 2 to be a destination is determined such that, as many the Hadoop virtual machines 23, whose determined processing state is HDFS write/read or Shuffle & Sort processing, as possible are integrated on a single host 2 (FIG. 8). For Hadoop virtual machines 23 whose determined processing state is MapReduce processing, the host 2 that is to be a destination is determined such that the Hadoop virtual machines 23 are not integrated on a single host 2 (FIG. 10). Thus, live-migration of each Hadoop virtual machine 23 is performed so as to enable distributed processing to be executed at higher speed while maintaining an environment where each Hadoop virtual machine 23 may be pleasantly operated. Setting of the connection relationship between the hosts 2 and the hard disk drives 3 in DAN 5 is updated in accordance with the migration of the Hadoop virtual machine 23.

Note that, in the embodiment, the Hadoop virtual machine 23 that is in a slave mode in which distributed processing using Hadoop is performed is a target of live-migration, but distributed processing may be executed by some platforms other than Hadoop. This is because in many cases, even in distributed processing executed by some platforms other than Hadoop, as long as distributed processing is performed, the processing state of a virtual machine transitions.

In measurement of the communication volume performed for determining the processing state, the communication volume is measured separately for the HDFS communication volume and for the MapReduce communication volume. However, as illustrated in FIG. 3, the processing state may be determined based on the CPU utilization and the communication volume, although accuracy in measurement is reduced. Therefore, measurement of the communication volume may not be performed separately for the HDFS communication volume and for the MapReduce communication volume. Also, the communication volume that is to be measured may be selected in accordance with a platform used for distributed processing.

In the embodiment, the Hadoop virtual machine 23 whose determination result of the processing state has been changed, is a candidate for a target of live-migration, but a candidate for a target of live-migration is not limited thereto. Integrating as many Hadoop virtual machines 23 on which Shuffle & Sort processing is performed as possible on the same host 2 is more effective in increasing processing speed of distributed processing. From this view point, live-migration may be performed with focus on integration of the Hadoop virtual machines 23 on which Shuffle & Sort processing is performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A system for executing a plurality of virtual machines, the system comprising:
   a plurality of information processing devices coupled to each other via a network, each of the plurality of information processing devices executing one or more virtual machines by using a processor thereof; and
   a plurality of storage devices connected coupled to the plurality of information processing devices, wherein
   a management device, which is one of the plurality of information processing devices, includes at least one processor configured to:
   when a plurality of first virtual machines used for distributed processing are created, monitor a utilization ratio of the processor used for executing each of the plurality of first virtual machines, a first communication volume used for an access of each of the plurality of first virtual machines to one of the plurality of storage devices, and a second communication volume used for arithmetic processing of each of the plurality of first virtual machines performed on data stored in the plurality of storage devices, the plurality of first virtual machines being included in the plurality of virtual machines;
   control, when information of the first communication volume, the second communication volume, and the utilization ratio is received by the at least one processor, a migration of each of the plurality of first virtual machines between the plurality of information processing devices based on the utilization ratio of the processor, the first communication volume, and the second communication volume;
   determine whether it is possible to change an amount of resource allocation to the at least one of the plurality of first virtual machines whose processing state has been determined being in operation and is not to be migrated; and
   change, when it is determined it is possible to change the resource allocation amount, the resource allocation amount to the at least one of the plurality of first virtual machines that is to be migrated.

2. The system of claim 1, wherein the at least one processor:
   estimates, based on the utilization ratio of the processor, the first communication volume, and the second communication volume, a processing state of each of the plurality of first virtual machines; and
   controls a migration of each of the plurality of first virtual machines, based on the estimated processing state.

3. The system of claim 1, wherein
connections between the plurality of information processing devices and the plurality of storage devices are provided via another network that couples each of the plurality of information processing devices to one of the plurality of storage devices that is accessible from the each information processing device; and
the at least one processor changes a connection relationship between the plurality of information processing devices and the plurality of storage devices via the another network, upon migrating at least one of the plurality of first virtual machines.

4. The system of claim 1, wherein the processing state is determined based on the utilization ratio of the processor, the first communication volume, and the second communication volume.

5. The method of claim 1, wherein the processing state is determined based on the utilization ratio of the processor, the first communication volume, and the second communication volume.

6. A non-transitory, computer-readable recording medium having stored therein a program for causing a computer to execute a process, the computer being operated as a management unit in a system that includes a plurality of information processing devices coupled to each other via a network and a plurality of storage devices connected to the plurality of information processing devices, each of the plurality of information processing devices executing one or more virtual machines by using a processor thereof, the process comprising:

when a plurality of first virtual machines used for distributed processing are created, monitoring a utilization ratio of the processor used for executing each of the plurality of first virtual machines, a first communication volume used for an access of each of the plurality of first virtual machines to one of the plurality of storage devices, and a second communication volume used for arithmetic processing of each of the plurality of first virtual machines performed on data stored in the plurality of storage devices, the plurality of first virtual machines being included in the plurality of virtual machines;

controlling, when receiving information of the first communication volume, the second communication volume, and the utilization ratio, a migration of each of the plurality of first virtual machines between the plurality of information processing devices, based on the utilization ratio of the processor, the first communication volume, and the second communication volume;

determining whether it is possible to change an amount of resource allocation to the at least one of the plurality of first virtual machines whose processing state has been determined being in operation and is not to be migrated; and changing, when it is determined it is possible to change the resource allocation amount, the resource allocation amount to the at least one of the plurality of first virtual machines that is to be migrated.

7. The non-transitory, computer-readable recording medium of claim 6, wherein the processing state is determined based on the utilization ratio of the processor, the first communication volume, and the second communication volume.

8. A method for performing a plurality of virtual machines, the method being performed by a management unit in a system that includes a plurality of information processing devices coupled to each other via a network and a plurality of storage devices connected to the plurality of information processing devices, each of the plurality of information processing devices executing one or more virtual machines by using a processor thereof, the method comprising:

when a plurality of first virtual machines used for distributed processing are created, monitoring a utilization ratio of the processor used for executing each of the plurality of first virtual machines, a first communication volume used for an access of each of the plurality of first virtual machines to one of the plurality of storage devices, and a second communication volume used for arithmetic processing of each of the plurality of first virtual machines performed on data stored in the plurality of storage devices, the plurality of first virtual machines being included in the plurality of virtual machines;

controlling, when receiving information of the first communication volume, the second communication volume, and the utilization ratio, a migration of each of the plurality of first virtual machines between the plurality of information processing devices, based on the utilization ratio of the processor, the first communication volume, and the second communication volume;

determining whether it is possible to change an amount of resource allocation to the at least one of the plurality of first virtual machines whose processing state has been determined being in operation and is not to be migrated; and changing, when it is determined it is possible to change the resource allocation amount, the resource allocation amount to the at least one of the plurality of first virtual machines that is to be migrated.

* * * * *